(12) United States Patent
Matsuya

(10) Patent No.: US 8,482,805 B2
(45) Date of Patent: Jul. 9, 2013

(54) EMBEDDING DATA IN A PRINT IMAGE

(75) Inventor: Akihiro Matsuya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1149 days.

(21) Appl. No.: 11/776,806

(22) Filed: Jul. 12, 2007

(65) Prior Publication Data

US 2008/0037037 A1    Feb. 14, 2008

(30) Foreign Application Priority Data

Aug. 9, 2006 (JP) .................................. 2006-216916

(51) Int. Cl.
*H04N 1/40* (2006.01)
(52) U.S. Cl.
USPC .......................................... 358/3.28; 358/1.2
(58) Field of Classification Search
USPC ................................................ 358/1.2, 3.28
See application file for complete search history.

(56) References Cited

U.S. PATENT DOCUMENTS

| | | | |
|---|---|---|---|
| 6,297,890 B1 | 10/2001 | Fukuda et al. | 358/1.9 |
| 6,597,471 B1 * | 7/2003 | Yoshikawa | 358/1.2 |
| 7,085,399 B2 | 8/2006 | Suzaki | 382/100 |
| 7,492,483 B2 * | 2/2009 | Inoue | 358/3.14 |
| 2001/0042234 A1 | 11/2001 | Sasaki et al. | 714/752 |
| 2002/0181738 A1 * | 12/2002 | Nakamura et al. | 382/100 |
| 2004/0120544 A1 | 6/2004 | Eguchi et al. | 382/100 |
| 2007/0201719 A1 | 8/2007 | Hashimoto et al. | 382/100 |

FOREIGN PATENT DOCUMENTS

| | | |
|---|---|---|
| JP | 2003-101762 | 4/2003 |
| JP | 2004-104484 | 4/2004 |
| JP | 2005-260483 | 9/2005 |
| JP | 2005/318496 | 11/2005 |

* cited by examiner

*Primary Examiner* — Eric A Rust
(74) *Attorney, Agent, or Firm* — Fitzpatrick, Cella, Harper & Scinto

(57) ABSTRACT

An image processing apparatus which can determine the image quality of code data in consideration of the print characteristics of an output device (copying machine or printer) is provided. A code data input unit inputs code data to be added to an image. A print precision data input unit inputs print precision data indicating the print precision of the code data by a printing device. An image quality determination unit determines, based on the code data and the print precision data, the image quality when the printing device prints the code data.

8 Claims, 14 Drawing Sheets

FIG. 5

| INDEX | ERROR CORRECTION SIZE |
|---|---|
| 0 | 10% |
| 1 | 15% |
| 2 | 20% |
| 3 | 25% |
| 4 | 30% |
| 5 | 40% |
| 6 | 50% |
| 7 | 60% |

FIG. 6

| INDEX | REDUNDANCY |
|---|---|
| 0 | ONCE |
| 1 | TWICE |
| 2 | 3 TIMES |
| 3 | 4 TIMES |
| 4 | 5 TIMES |
| 5 | 10 TIMES |
| 6 | 15 TIMES |
| 7 | 20 TIMES |

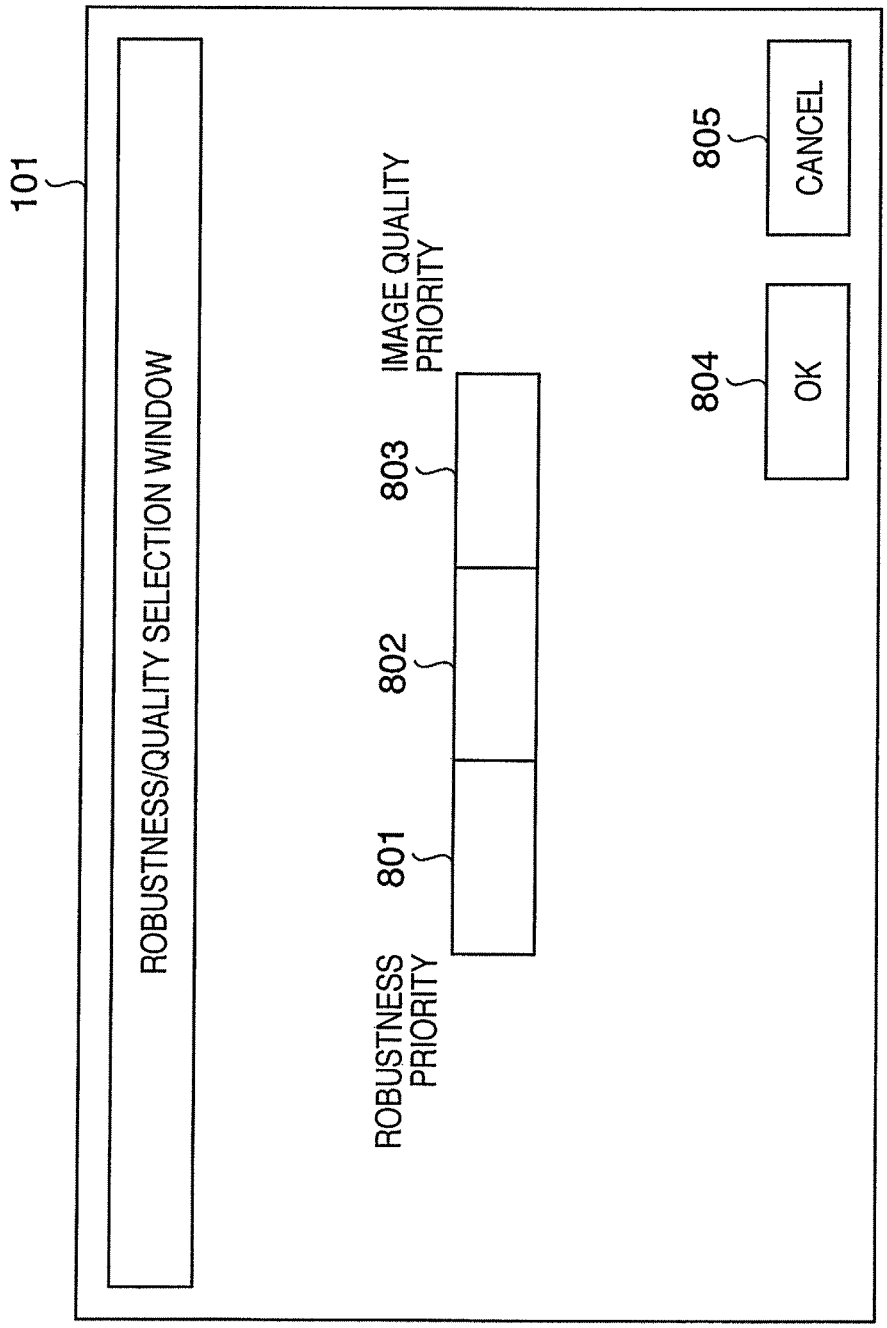

F I G. 10
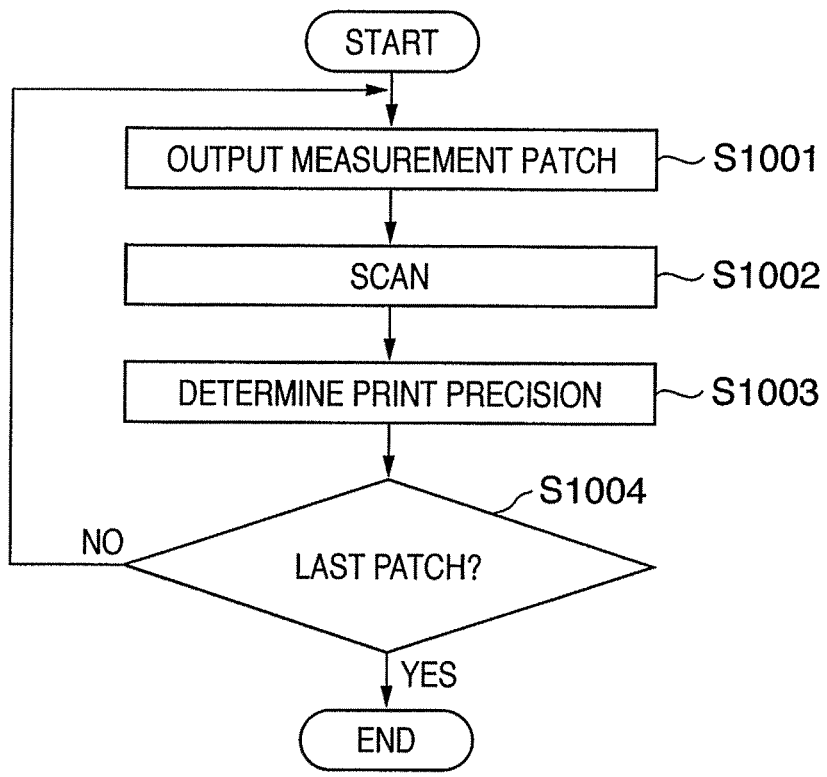

FIG. 11A

| -2 | -24 | -27 | -24 | -2 |
|---|---|---|---|---|
| -24 | 9 | 62 | 9 | -24 |
| -27 | 62 | 152 | 62 | -27 |
| -24 | 9 | 62 | 9 | -24 |
| -2 | -24 | -27 | -24 | -2 |

FIG. 11B

| 0 | -2 | -5 | -6 | -5 | -2 | 0 |
|---|---|---|---|---|---|---|
| -2 | -7 | -6 | -2 | -6 | -7 | -2 |
| -5 | -6 | 18 | 39 | 18 | -6 | -5 |
| -6 | -2 | 39 | 64 | 39 | -2 | -6 |
| -5 | -6 | 18 | 39 | 18 | -6 | -5 |
| -2 | -7 | -6 | -2 | -6 | -7 | -2 |
| 0 | -2 | -5 | -6 | -5 | -2 | 0 |

FIG. 12

| INDEX | RESULT |
|-------|--------|
| 0 | 0 |
| 1 | 0 |
| 2 | 1 |
| 3 | 1 |

EMBEDDING DATA IN A PRINT IMAGE

BACKGROUND OF THE INVENTION

1. Field of the Invention

The present invention relates to an image processing technique for embedding data in a print image.

2. Description of the Related Art

In recent years, an image processing method that converts data to be embedded into code data that requires some decoding processing, and prints the code data on a print medium has prevailed.

For example, this code data is two-dimensionally embedded with data, and is called a two-dimensional (2D) code.

The user cannot recognize the contents of the printed code data intact. When the user reads the code data as image data using a reader, and applies corresponding decoding processing to that image data, he or she can recognize the contents of the code data.

In general, the read image data is transferred to a computer, and an application program which runs on the computer decodes the image data. However, the decoding method is not limited to such specific method. For example, a mobile phone compatible to the 2D code can decode the code data inside its reader, or a copying machine having a plurality of functions can internally decode the code data.

Normally, code data is printed on a print medium together with text and images to be printed. As a technique for printing the code data on a print medium, a technique for providing directionality to the size of a rectangle calculated in consideration of the code data and a paper size to be used in printing, and embedding the code data in that rectangle is known (for example, see Japanese Patent Laid-Open No. 2003-101762).

Upon applying the code data to a print medium (mainly, a paper sheet), the data size (code size) of the code data have a tradeoff relationship with image quality after combining text and images to be printed together with the code data. For example, if the paper size to be used in printing remains the same, the size of code data to be added increases with increasing data to be embedded. Upon enhancing error robustness, the size of this code data further increases. As a result, after combining with text and images to be printed, the code data impairs image quality since it looks like noise. Hence, in order to add the code data so as not to impair image quality, a data size required to enhance the error robustness such as the size of an error correction code and the like must be limited to some extent.

To this end, Japanese Patent Laid-Open No. 2004-104494 discloses a technique for adjusting image quality after combining code data with text and images to be printed and the error robustness.

However, the conventional code data generation processing does not consider the print characteristics of an output device (a copying machine or a printer), which change due to individual differences, environmental changes, and time differences.

SUMMARY OF THE INVENTION

The present invention has been made in consideration of the aforementioned problems, and has as its object to determine the image quality of code data in consideration of the print characteristics that are prone to change.

It is another object of the present invention to generate code data in consideration of the changing print characteristics. For example, it is an object of the present invention to provide an image processing apparatus which controls the error robustness and image quality depending on a dot formation state output from an output device so as to generate code data to be printed on a print medium.

According to one aspect of the present invention, an image processing apparatus includes a code data input unit adapted to input code data to be added to an image, a print precision data input unit adapted to input print precision data indicating a print precision of the code data by a printing device, and an image quality determination unit adapted to determine, based on the code data and the print precision data, an image quality when the printing device prints the code data.

According to another aspect of the present invention, an image processing method includes the steps of inputting code data to be added to an image, inputting print precision data indicating a print precision of the code data by a printing device, and determining, based on the code data and the print precision data, an image quality when the printing device prints the code data.

Further features of the present invention will become apparent from the following description of exemplary embodiments with reference to the attached drawings.

BRIEF DESCRIPTION OF THE DRAWINGS

FIG. 5 shows an example of a lookup table used to designate an error correction code size;

FIG. 6 shows an example of a lookup table used to designate a redundancy;

FIG. 8 shows an example of a window that allows the user to set the robustness and quality;

FIG. 10 is a flowchart showing an example of the processing for determining the print precision;

FIGS. 11A and 11B show examples of mask patterns used for dot detection;

FIG. 12 shows an example of a dot definition table;

DESCRIPTION OF THE EMBODIMENTS

Various exemplary embodiments, features, and aspects of the present invention will be described in detail below with reference to the drawings.

First Embodiment

This embodiment will explain a printing device which determines image quality based on its print characteristics, and can generate code data optimal to a print medium and, more particularly, a copying machine having a plurality of functions.

Figure 1:
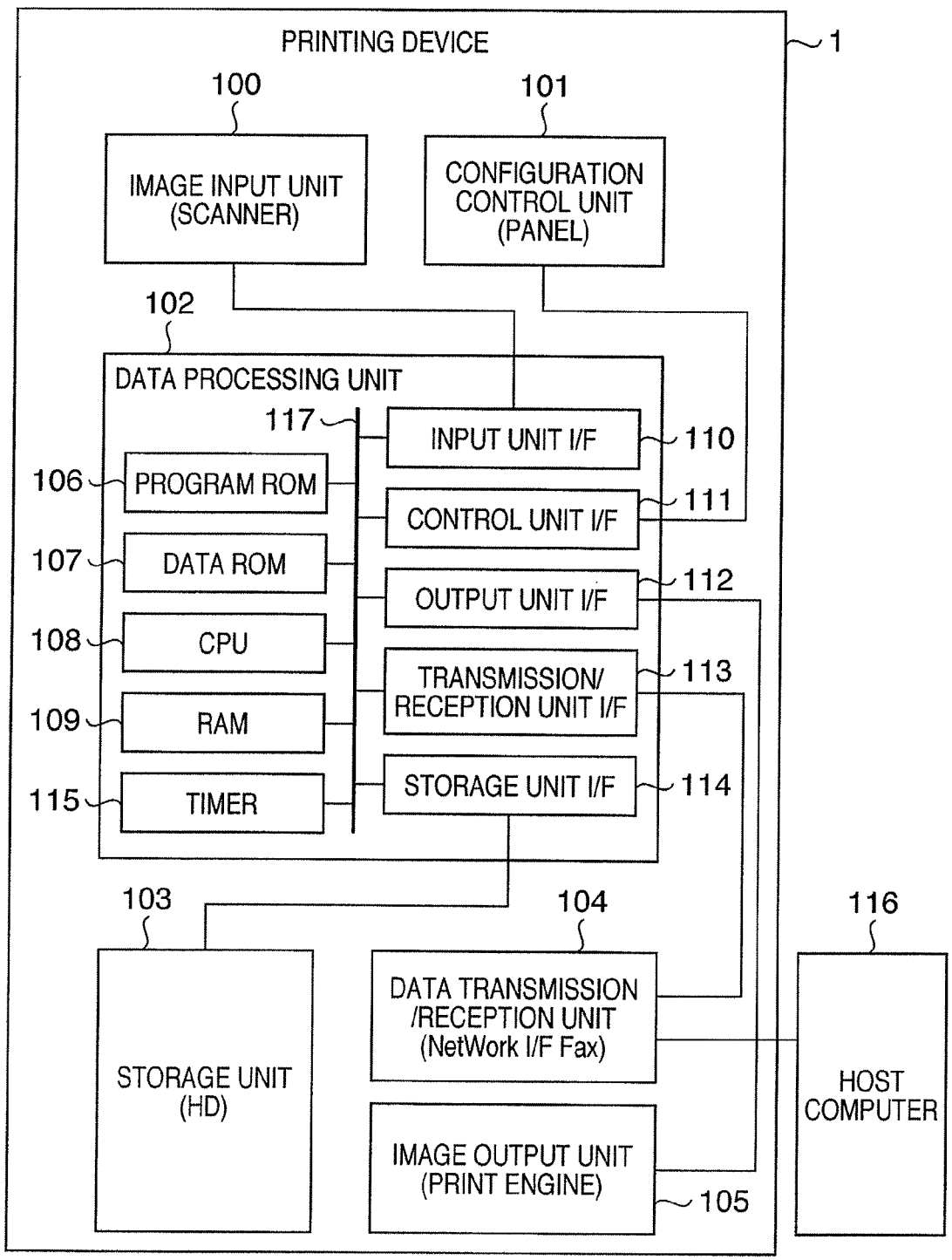
FIG. 1 is a block diagram showing an image processing apparatus and printing device according to the present invention.

FIG. 1 shows a printing device according to the present invention.

A printing device 1 comprises the following processing units. Reference numeral 100 denotes an image input unit such as a scanner or the like. Reference numeral 101 denotes a configuration control unit such as a user interface (UI) panel and the like. Reference numeral 102 denotes a data processing unit such as a video controller and the like. Reference numeral 103 denotes a storage unit such as a hard disk (HD) and the like. Reference numeral 104 denotes an image transmission/reception unit such as a network interface (I/F) boar, FAX, and the like; and 105, an image output unit such as a printer and the like. This embodiment will explain an embodiment using a copying machine which is connected to a host computer 116, and comprises a printer and scanner to integrate a copy function, FAX function, and the like. However, the present invention is not limited to such specific embodiment.

The data processing unit 102 comprises the following processors. Reference numeral 110 denotes an input unit I/F; 111, a control unit I/F; 112, an output unit I/F; 113, a transmission/reception unit I/F; and 114, a storage unit I/F. Reference numeral 106 denotes a program ROM which stores data processing and control programs. Reference numeral 107 denotes a data ROM; 108, a CPU; 109, a RAM serving as a main memory; and 115, a timer (timepiece function). The above processors are interconnected via an internal bus 117.

The data processing unit 102 fetches image data by scanning an input image using the image input unit 100, or by receiving image data, which is sent from an external host computer or external FAX or via a network, via the image transmission/reception unit 104.

The image data fetched by the data processing unit 102 undergoes image processing in accordance with an operation configuration set by the image input unit 100 or operation configuration data included in the externally transmitted image data. After that, upon printing the image data that has undergone the image processing by the printing device, that image data is output to the image output unit 105. Upon transmitting print data to the external network, the image data is output to the data transmission/reception unit 104. Upon storing the image data in the printing device, the image data is output to the storage unit 103.

When the data processing unit 102 processes the image data, data in the data ROM 107 and the like are referred to as needed. A program is read out from the program ROM 106 in accordance with the processing operation configuration acquired via the control unit I/F 111, and image processing is executed using the RAM 109, storage unit 103, and the like.

Figure 2:
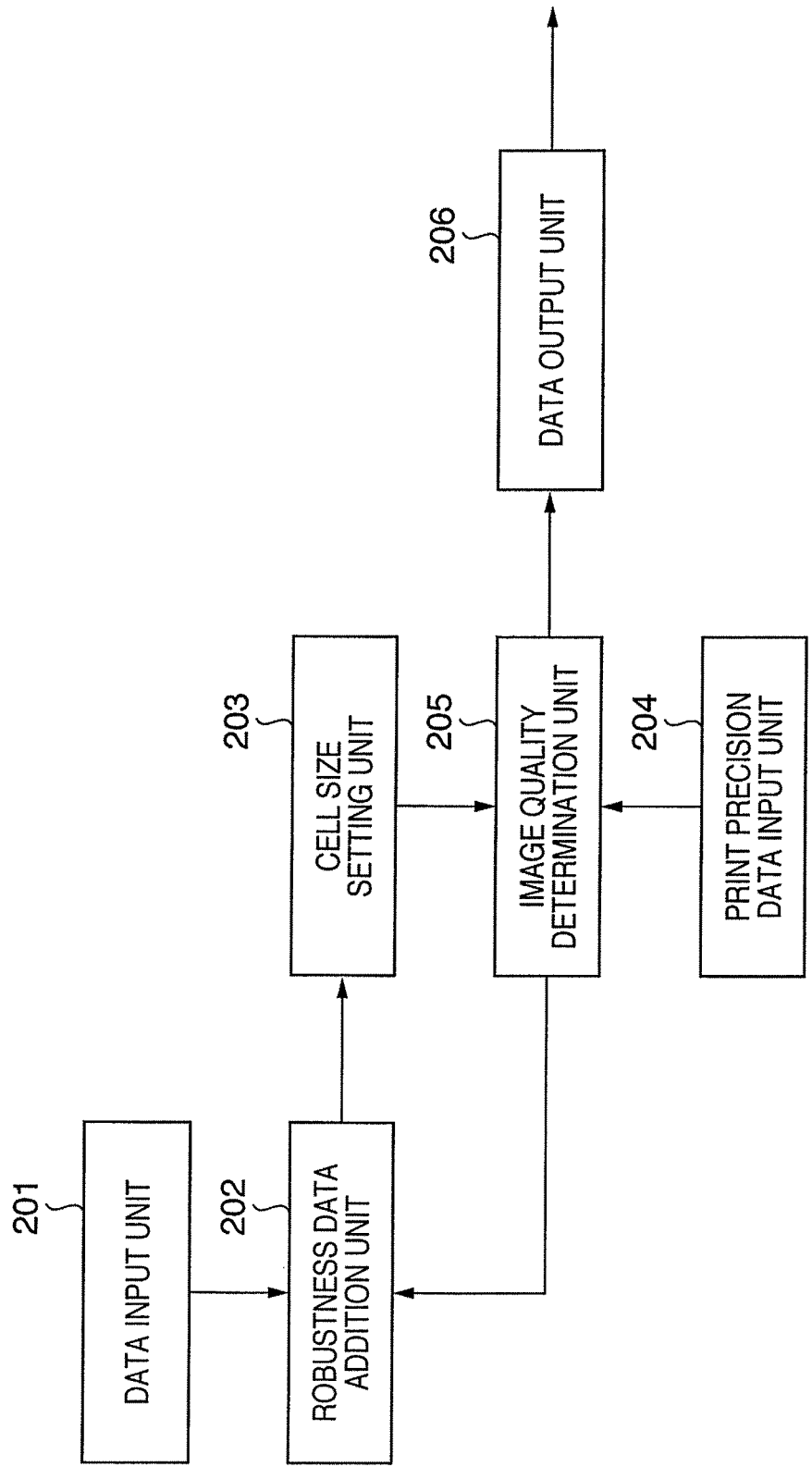
FIG. 2 is a block diagram showing the arrangement of a data processing unit 102 according to the first embodiment.

FIG. 2 is a block diagram showing the arrangement of this embodiment.

A data input unit 201 inputs embedding data to be embedded in an image, and converts the input embedding data into code data. A robustness data addition unit 202 receives the code information, adds robustness information to the input code data, and generates and adds the code data added with the robustness data a predetermined number of times. A cell size setting unit 203 decides a cell size based on the code size of the code data added with the robustness data by the robustness data addition unit 202, and the area of a print medium where an image is to be printed. On the other hand, a print precision data input unit 204 receives print precision data recorded in the storage unit 103. An image quality determination unit 205 determines the quality of an image based on the density of dots in the cell size set by the cell size setting unit 203 and the print precision data input to the print precision data input unit 204. The robustness data addition unit 202 controls the size of the robustness data in accordance with the determination result of the image quality by the image quality determination unit 205. When the user is satisfied with the determination result of the image quality by the image quality determination unit 205, a data output unit 206 outputs the code data as print data.

Figure 3:
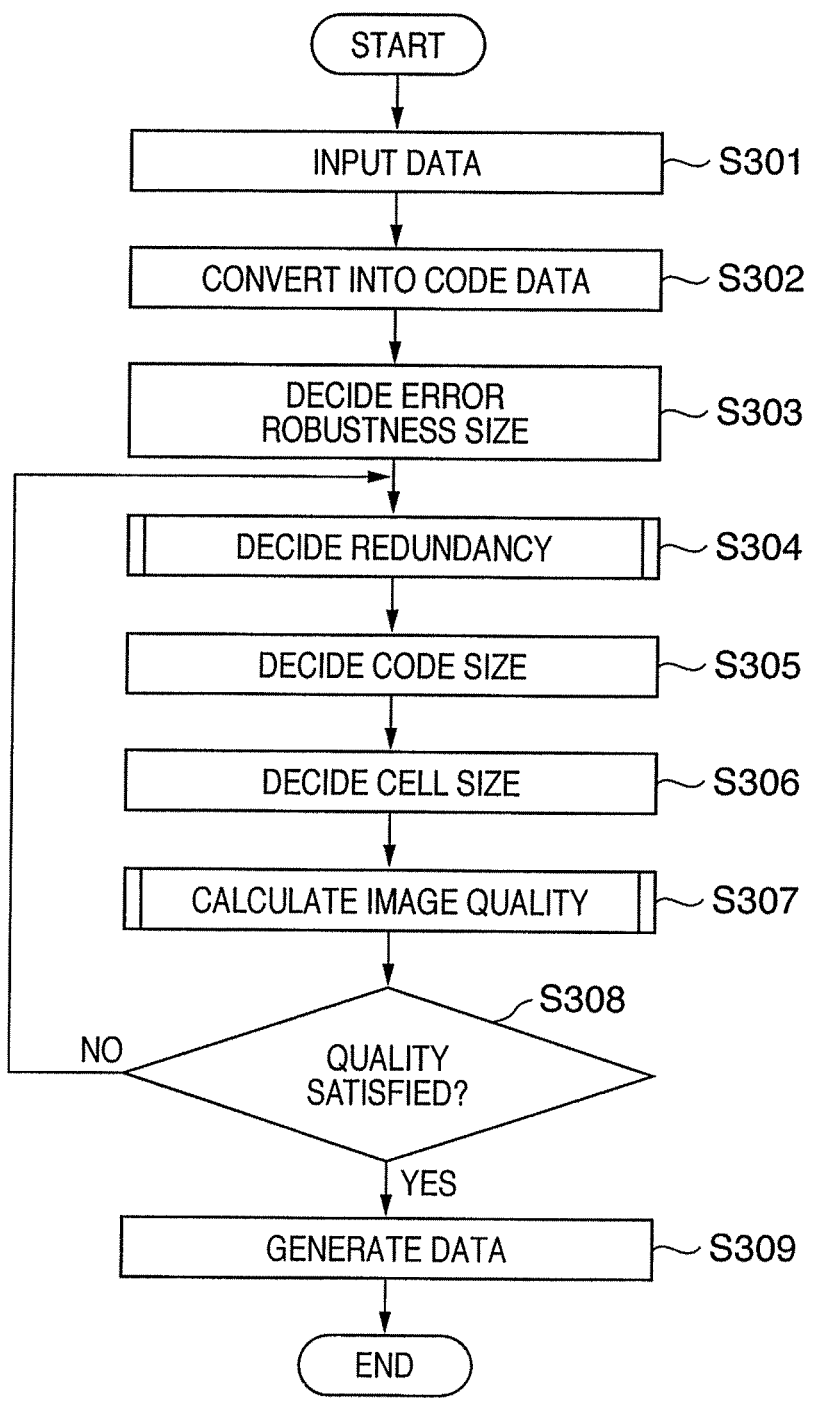
FIG. 3 is a flowchart showing the processing for printing code data to be explained in the first embodiment.

Details of code data generation processing of this embodiment will be described below along the code data generation processing shown in FIG. 3.

Step S301: Data to be coded is input. The data to be coded is input from the configuration control unit 101 or a dedicated application, printer driver (not shown), or the like on the host computer 116 connected to the printing device 1 based on an instruction from the user or an administrator of the printing device. In this case, data such as text or the like may be directly input or the location of data to be coded may be designated, and that data may be downloaded from the designated location to the application or printing device. Alternatively, meta data such as the user ID, print date & time, print job ID, and the like may be input and coded. Note that not only the user or the administrator of the printing device designates the data but also data (user ID, print date & time, print job ID, and the like) held inside the printing device may be automatically designated as data to be coded.

Figure 4:
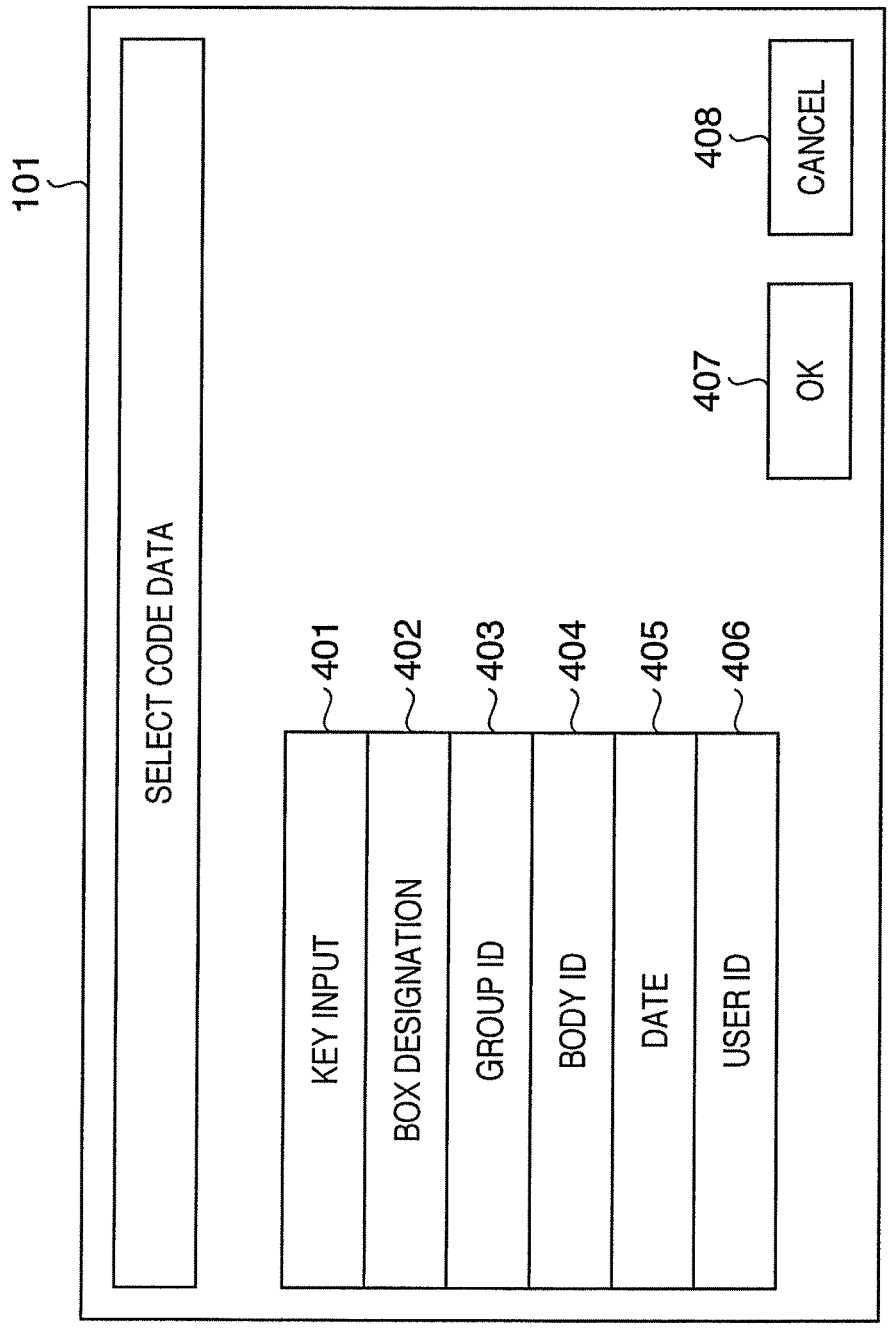
FIG. 4 shows an example of a window that allows the user to select a source of code data.

FIG. 4 shows an example of a window that allows the user to select data to be input from the printing device main body. The selection window allows the user to select displayed items via the configuration control unit 101. Reference numeral 401 denotes a key input item that allows the user to directly input data to be coded. Reference numeral 402 denotes a BOX designation item that allows the user to select data pre-stored in the storage unit 103. Reference numeral 403 denotes a group ID designation item that allows the user to designate a management group of the operator. Reference numeral 404 denotes a body ID item that allows the user to designate the body number of the main body. Reference numeral 405 denotes a date designation item that allows the user to designate an output date. Reference numeral 406 denotes a user ID designation item that allows the user to designate an ID that specifies an output user. Reference numeral 407 denotes an OK key used to settle settings; and 408, a cancel key used to cancel the settings.

Step S302: The data input or designated in step S301 is converted into code data. Initially, the data input unit 201 analyzes a data sequence input or designated in step S301. Then, the input data sequence is converted into a predetermined bit sequence, and a specifier that specifies a mode (numeric characters, alphanumeric characters, 8-bit byte, kanji, and the like) and a terminal pattern are added to the data as needed. That data is then converted into a predetermined bit code. Finally, in step S302 code data with a code size S (bits) is generated. Note that the code conversion method is not specified, and data is converted into code data after consistency with a decoding algorithm is ensured. Note that the code data may undergo arithmetic processing such as encryption and the like.

Step S303: An error correction code is added to the code data as robustness data that enhances the robustness of the code data. FIG. 5 shows a lookup table 501 which is held in the storage unit 103 of the printing device 1 and is used to determine an error correction code size. A column 502 indicates an index used to designate the error correction code size, and a column 503 indicates the ratio of the corresponding error correction code size (the ratio of the error correction code size to the code size S). In this embodiment, the error correction code size is decided by the numerical value in FIG.

5. Alternatively, the user or administrator may change or create the lookup table 501 directly or via the network.

Initially, in the lookup table 501 an index: 2 (error correction code size=20%) is designated as a default value. After the error correction code size is designated, code data with a code size N (bits) is generated by adding an error correction code to the code data converted in step S302.

$$N=S+X \quad (1)$$

where X: the code size (bits) increased by the error correction code size.

As the error correction code method, a BCH code premised on the 2D code, a Reed-Solomon code compatible to a multi-dimensional code, an LDPC (low-density parity check code) code, or the like is used. However, the present invention is not limited to such specific code.

Step S304: A redundancy A is added to the code data with the code size N generated in step S303 as robustness data that can further enhance the robustness. FIG. 6 shows a lookup table 601 used to decide the redundancy. A column 602 indicates an index used to designate a redundancy, and a column 603 indicates a corresponding redundancy count. In this embodiment, the redundancy A is decided by the numerical value in FIG. 6. Alternatively, the user or administrator may change or create the lookup table 601 directly or via the network.

In the lookup table 601, an index: 5 (number of repetition times=10) is designated. If the image quality is not satisfied in step S308 to be described later, the determined index is updated in step S304.

Step S305: A code size M of the code data to be finally printed on a print medium is decided by:

$$M = A \times N \quad (2)$$

where A: a redundancy (the number of repetition times of code data N)

Step S306: A cell size in which the code data is to be embedded is decided based on the code size M decided in step S305.

The cell size is defined by dividing a document area where the code data is to be embedded in accordance with the code size M, and one or a plurality of bits of the code size M can be embedded for each cell size.

The present invention expresses the code data as a set of dots. However, as a method of embedding a set of dots in a cell, each cell may express code data (one cell expresses "1" or "0" or one cell may a plurality of bits. In this embodiment, one cell expresses 1 bit. For example, when one cell expresses 1 bit, for example, if a dot is located above the center of a cell, it represents "1"; if a dot is located below the center of the cell, it represents "0".

Figure 7:
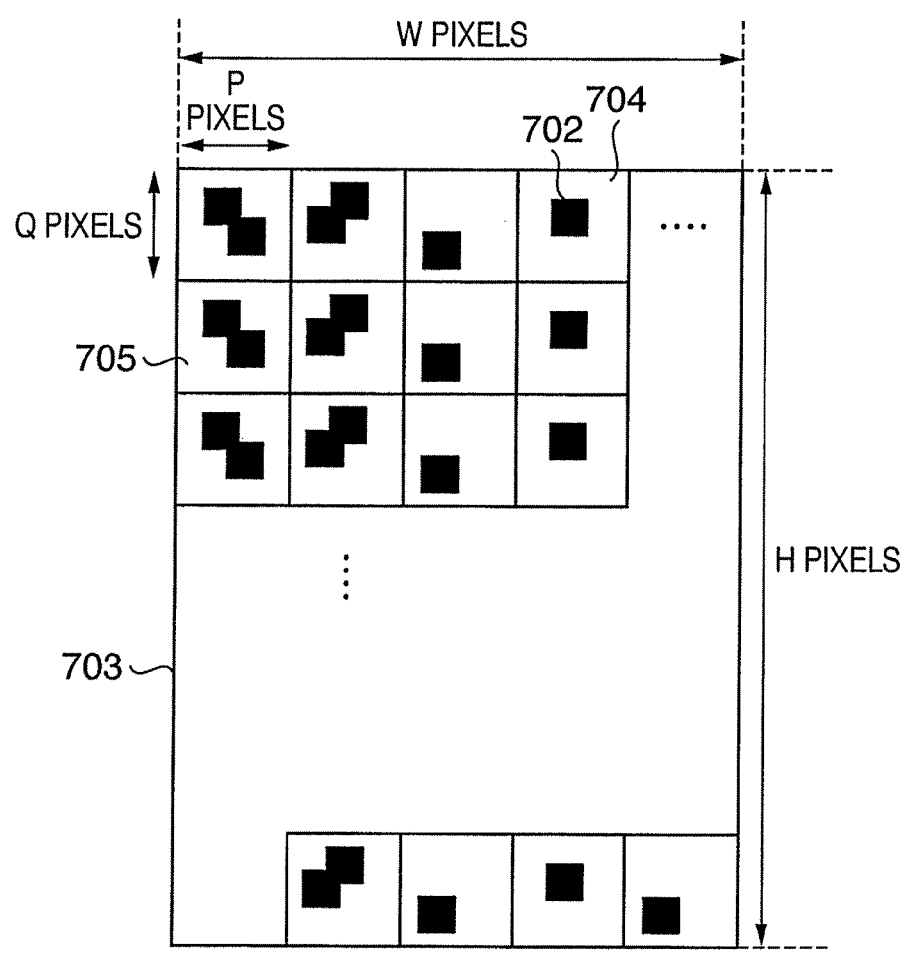
FIG. 7 shows an example of the second code data embedding processing.

Since the data size to be embedded in the document area is M bits from step S305, the minimum required number of cells is M. As shown in FIG. 7, the cell size that can be formed on an image size to be printed: W pixels (main scan direction)×H pixels (sub-scan direction) is decided by:

$$\text{Cell size}(P \times Q)[S] = [W \times H/M] \quad (3)$$

[S]: a maximum integer less than S.

Assuming that W'=4961 pixels, H=7016 pixels, and M=600 kbits as the image size, the cell size (P×Q)=58. If a precondition P=Q is given, P=7 (pixels) is obtained. A pixel size may be calculated under the condition of P≠Q. In this case, an optimal pixel size is calculated based on the factor that defines the cell size, and the ratio of P and Q.

A cell 704 in FIG. 7 is an example added with one dot size 702, and a cell 705 is an example added with two dot sizes 702.

In FIG. 7, the full area of a document size 703 is divided into cell sizes. However, only a partial area of the document size may be divided into cell sizes in accordance with the data size to be embedded.

Step S307: Image quality is calculated based on the cell size decided in step S306 and the number of pixels that expresses one dot to be described later.

In this embodiment, assume that a dot size of 3×3 pixels is determined as that which can definitely be reproduced by the output device with reference to a dot definition table (to be described later) that describes print precision data generated by print precision determination processing to be described later. Hence, in case of FIG. 7, dot sizes 702 having 3×3 pixels as a minimum unit replace the dot size to be expressed in a cell, thereby calculating the maximum number Y of pixels of a dot. The maximum number Y of pixels of a dot is obtained by searching the maximum number of pixels of dots (expressed by black in this embodiment) in M cell sizes for P pixels in the main scan direction and for Q (P in case of P=Q) pixels in the sub-scan direction. For example, if the dot size determined by the print precision determination processing is 3×3 pixels, and data is expressed by one dot in all cell sizes, the value of Y is 9.

Also, if the dot size determined by the print precision determination processing is 3×3 pixels, and data is expressed by one or two dots per cell, the value of Y is 18.

If dots are formed in all cells at the same density, only the maximum number of pixels of one cell need be calculated.

At this time, if the maximum number of pixels of a dot in a cell exceeds the image size P×Q of the cell, since the code data cannot be printed, it is determined in step S308 that the image quality is not satisfied.

In FIG. 7, since the cell 704 is expressed by one dot in the cell size, the dot size is 3×3=9 pixels. Since the cell 705 is expressed by two dots, the dot size is 3×3×2=18 pixels.

Next, image quality Qu is calculated by:

$$Qu = Y/(P \times Q) \quad (4)$$

Step S308: Qu calculated in step S307 is assessed using:

$$Qu \leq \alpha 1 : \text{High} \quad (5)$$

$$\alpha 1 < Qu \leq \alpha 2 : \text{Mid} \quad (6)$$

$$\alpha 2 < Qu : \text{Low} \quad (7)$$

The image quality Qu is decided by the ratio of a dot that occupies a cell, as given by equation (4). With reference to conditional formulas (5) to (7), by setting α1<α2 (α1 and α2 are equal to or larger than 0), if inequality (5) is met, the dot density that occupies the cell is low. Hence, in this state, it is determined that image quality is high. Conversely, if inequality (7) is met, the image quality may deteriorate, but the robustness to an output print material may become higher than the case in which inequality (5) or (6) is met. Hence, in this state, it is determined that robustness is high. The values of α1 and α2 may be arbitrarily determined in accordance with the characteristics of the printing device.

Conditional formulas (5) to (7) link with a window used to set the robustness/quality shown in FIG. 8. FIG. 8 allows the user to select the robustness and image quality in three levels: "robustness priority" level 801, "image quality priority" level 803, and "middle priority" level 802. The user can also select the condition using the configuration control unit 101 in accordance with data of a document to be added. Note that reference numeral 804 denotes an OK key used to settle the selected condition; and 805, a cancel key used to cancel the selected condition.

The level 801 corresponds to inequality (7) that represents robustness priority. The level 803 corresponds to inequality (5) that sets the highest image quality. The level 802 corresponds to inequality (6) that sets an intermediate level. In this embodiment, assume that the level 802 is set as a default setting.

If it is determined in step S308 that the image quality Qu is not satisfied, the lookup table 601 of the redundancy is looked up again. The index is set to be "5" as the default setting. However, upon re-setting the redundancy, the index is set to be "4" as a setting lower by one level, thus adjusting the redundancy.

After that, the same processing is repeated until the image quality Qu is satisfied. If the predetermined image quality Qu is satisfied, data is generated in step S309. If the image quality Qu is not satisfied, this processing is repeated until the index value in FIG. 5 indicates "0".

If the updated index 602 in FIG. 6 indicates "0", the configuration control unit 101 notifies the operator that the code data cannot be embedded based on the designated robustness/quality setting.

If the corresponding conditional formula is met in step S308, the process advances to step S309.

Step S309: If the corresponding conditional formula is met in step S308, the code data is generated as print data, thus ending the processing.

The generated code data is combined with image data from the scanner 100, PDL data from the host computer 116, and the like inside the data processing unit, and the combined data is output via the image output unit 105.

Print Precision Determination Processing

The print precision determination processing is executed independently from the code data generation processing. The print precision is determined using the minimum dot size that the printing device can print as a print criterion. The user or administrator launches the print precision determination processing periodically or at an arbitrary timing, and the processing result is stored in the printing device 1.

FIG. 10 is a flowchart showing the processing for deciding the print precision.

Figure 9A:
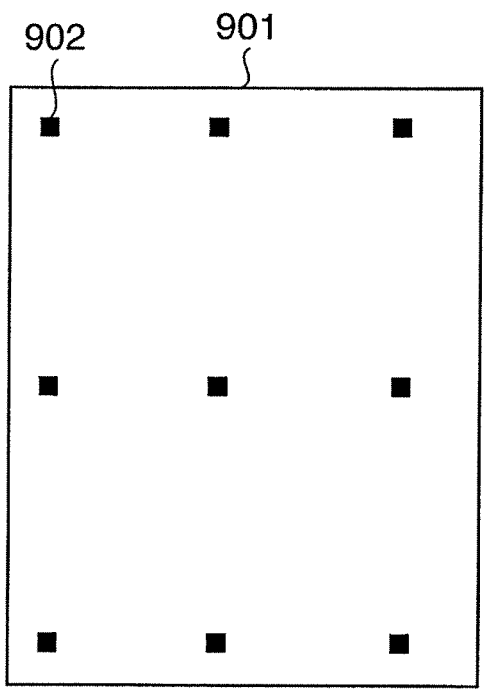
FIGS. 9A to 9D show examples of evaluation patterns used to measure the print precision.

Step S1001: Measurement patches (images) are output. In this embodiment, four patterns shown in FIGS. 9A to 9D are output as measurement patches. Each pattern is obtained by printing data of an identical dot size at nine points of an output paper size. Reference numeral 901 denotes a paper size to be output; 902 (FIG. 9A), a 1×1 dot size; 903 (FIG. 9B), a 2×2 dot size; 904 (FIG. 9C), a 3×3 dot size; and 905 (FIG. 9D), a 4×4 dot size. In step S1001, a pattern generation program stored in the storage unit 103 is launched, and the CPU 108 assures a predetermined memory area on the RAM 109. After measurement patch data in FIG. 9A is generated, the generated image data is output to and printed by the image output unit 105.

The measurement patches to be output are not limited to black ones. For example, a plurality of color patches may be generated and output.

Step S1002: The image input unit 100 scans the measurement patches output in step S1001. The scanned patch images are temporarily stored in the RAM 109 as patch image data via the input unit I/F 110.

In case of a color scanner, each patch image data is separated into signals of three channels red, green, and blue, and are fetched as multi-valued data. In case of a scanner of one channel, each patch image data is scanned as a gray signal and is fetched as multi-valued data.

Step S1003: It is checked if a detectable dot is printed in the patch image data stored in step S1002.

The print precision is determined by the convolution operation between mask patterns shown in FIGS. 11A and 11B and the patch image data temporarily stored in the RAM 109 in step S1002. The mask patterns shown in FIGS. 11A and 11B have different sizes and coefficients depending on the sizes of patch image data to be determined.

Figure 9B:
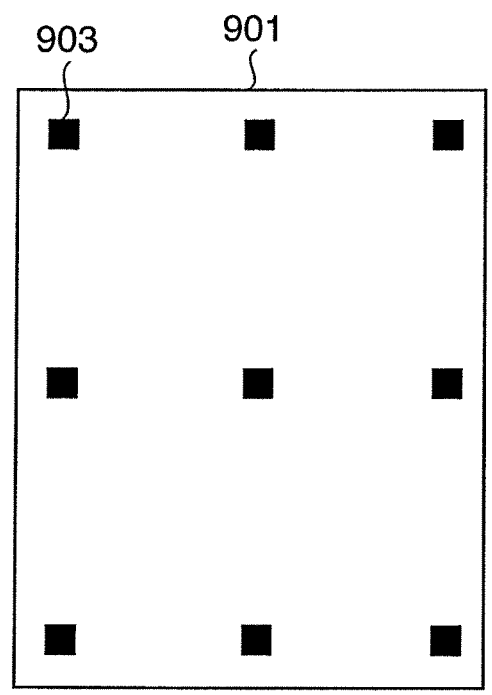
Figure 9C:
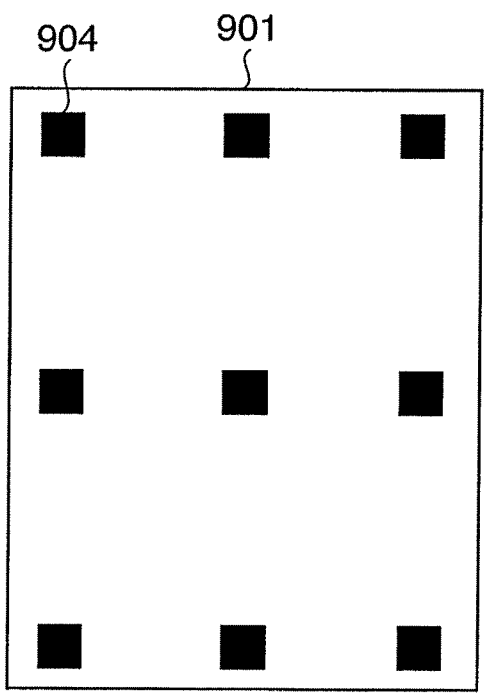
Figure 9D:
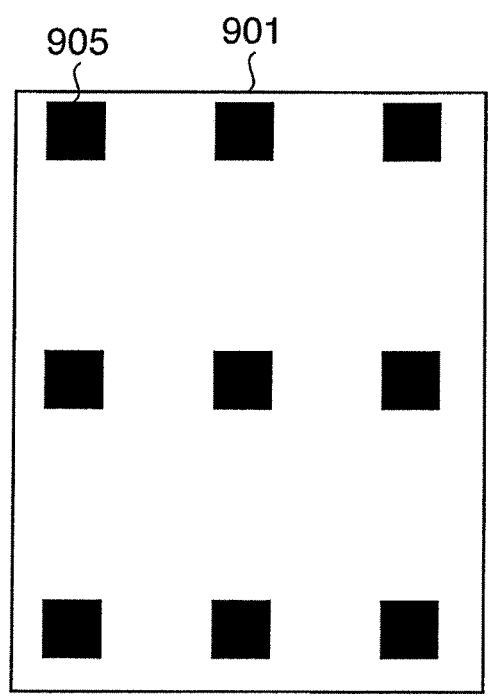

For example, FIG. 11A is used for the patch image data obtained by scanning the measurement patches shown in FIGS. 9A and 9B, and FIG. 11B is used for the patch image data obtained by scanning the measurement patches shown in FIGS. 9C and 9D. These mask patterns are stored in advance in the storage unit 103. The CPU 108 stores the convolution operation results in the RAM 109.

As the results of the convolution operation, peak values appear at nine positions in the plane of the patch image data every time one patch image data is processed. This embodiment calculates a detection value using:

$$|\text{Detection value}|=\min(\Sigma \text{peak value}) \quad (8)$$

Subsequently, the detection value is compared with a threshold: Thre to attain determination:

$$\text{If}(\text{detection value}\geq \text{Thre}[i])\text{determination}[i]=1 \quad (9)$$

$$\text{else determination}[i]=0 \quad (10)$$

where i is the number of patch image data. Hence, in the first scan, a determination result of determination [9] s set. If the determination result is "1", it indicates that the patch size can be applied to embedding of the code data; if the result is "0", it indicates that the printed dot is hardly detected, and that patch size cannot be applied to embedding of the code data.

Since it is effective to adaptively switch the threshold Thre depending on the patch size, this embodiment adopts the processing for switching the threshold.

Step S1004: It is confirmed if the last patch is processed. Steps S1001 to S1003 are repeated until the last patch is processed.

Figure 12:
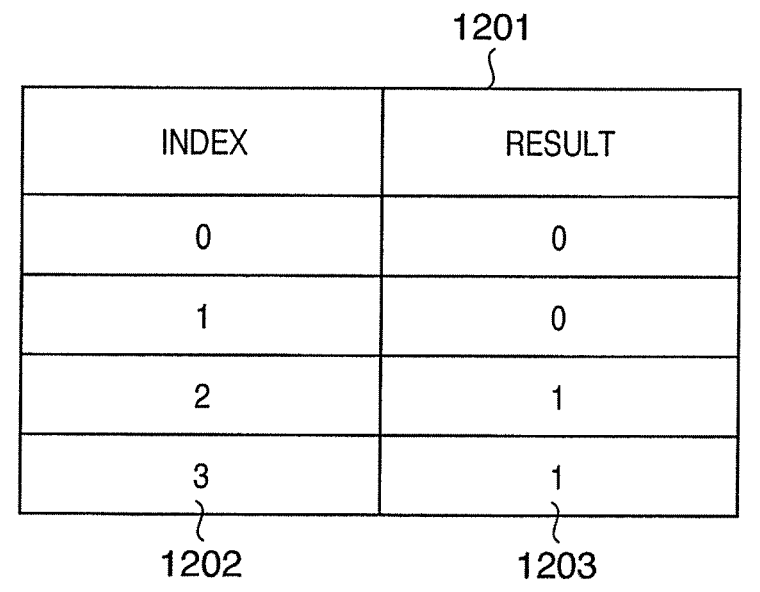

FIG. 12 shows a dot definition table 1201 generated by this processing. A column 1202 indicates an index, which corresponds to each dot size to be confirmed. A column 1203 stores the result determined by this flow. As the dot size to be applied in this embodiment, a dot size whose column 1203 describes "1" and which corresponds to the smallest index is applied. In case of FIG. 12, the dot size to be applied to the 2D data generation is a 3×3 dot size in FIG. 9C indicated by the index=2.

In this processing, the measurement patches are printed on a plurality of pages, and the printed patches are scanned. Alternatively, the measurement patches may be printed on one page together, and may be separately analyzed upon scanning.

In this embodiment, four different dot sizes are verified upon recognizing the characteristics of the output device. Alternatively, a plurality of more than four sizes may be used.

Furthermore, when the dot definition table 1201 stores all operation results="0", that is, when undetectable states are recognized at all the dot sizes, the configuration control unit 101 notifies the user of the contents. The notification may be simply displayed on the configuration control unit 101. Also, data may be sent to a driver (not shown) used in the host computer 116. Furthermore, that notification may be sent to a management server (not shown).

As described above, according to this embodiment, the image quality of the code data can be determined in consideration of the changing print characteristics. Also, the code data can be generated in consideration of the changing print characteristics.

Note that the number of conditions that represent the robustness/quality is not limited to three, and a larger number of conditions may be used to allow flexible determination.

Second Embodiment

Figure 13:
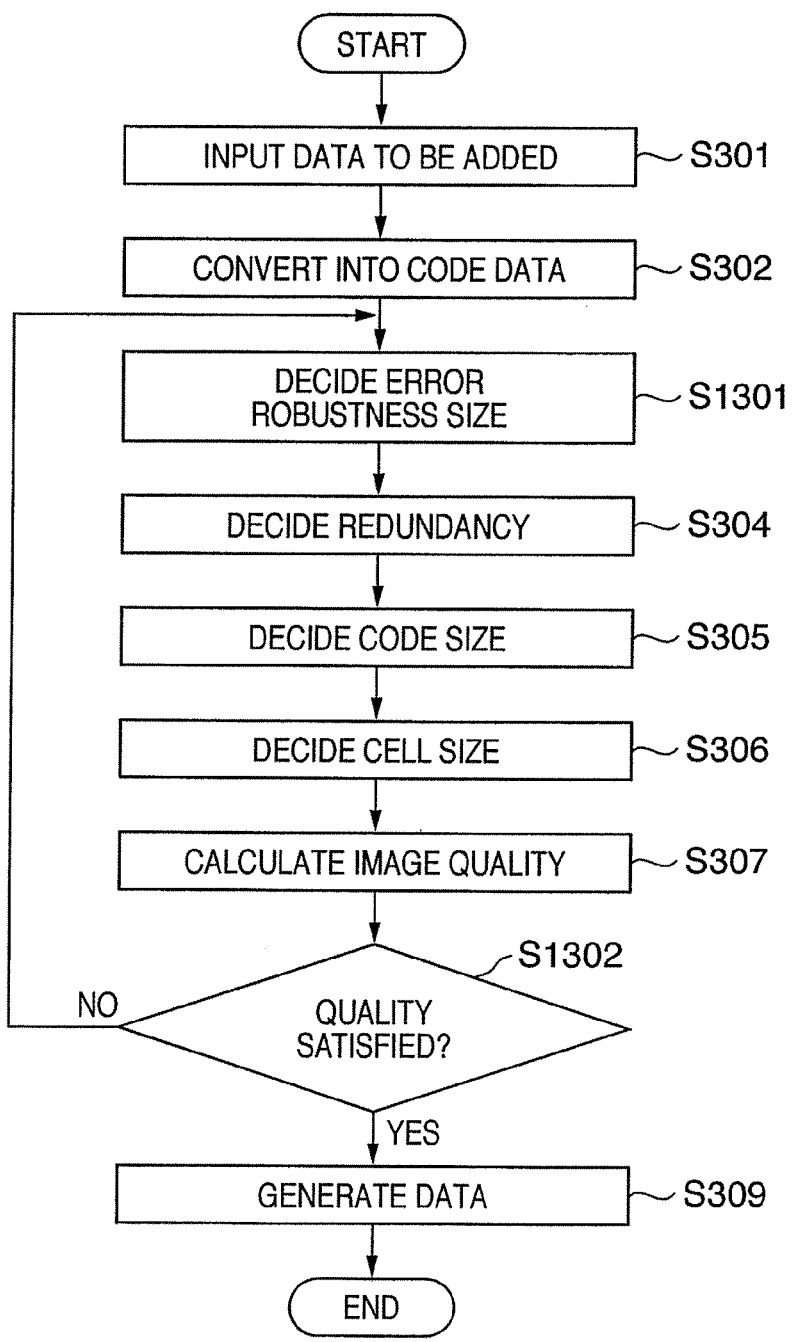
FIG. 13 is a flowchart showing the processing for printing code data to be described in the second embodiment.

This embodiment will explain processing for changing not only the redundancy but also the error correction code size, as shown in FIG. 13. The same reference numerals denote the same components as in the first embodiment, and a repetitive description thereof will be avoided. Only differences will be described below.

In step S1301, the index of the lookup table 501 is confirmed. If it is determined in step S1302 that the image quality Qu is not satisfied, the error correction code size is set again in step S1301.

At this time, the lookup table 501 of the error correction code size is looked up at the same time, and the index is updated to a lower value. If "2" is designated as a default value of the index, the index is updated to "1" (error correction code size=15%) in the current lookup. Subsequently, the image quality Qu is assessed in step S1302 to update the index. However, when the lookup table 501 of the error correction code size is looked up after the index indicates "0", the configuration control unit 101 notifies the operator that the code data cannot be embedded based on the designated robustness/quality setting.

In step S304, the lookup table 601 of the redundancy is looked up to update the index in FIG. 6 to a lower value. If "5" is designated as a default value of the index, the index is updated to "4" (redundancy=5 times) in the current lookup. Subsequently, the image quality Qu is assessed in step S1302 to update the index. However, when the lookup table 501 of the error correction code size is looked up after the index indicates "0", the configuration control unit 101 notifies the operator that the code data cannot be embedded based on the designated robustness/quality setting. With the processing of this embodiment as well, the same effects as in the first embodiment can be obtained.

Third Embodiment

The first embodiment has explained an embodiment of the present invention in an advanced-function printing device such as an MFP or the like. However, the present invention may be applied to a system configured by a plurality of devices (e.g., a host computer, interface device, scanner, printer, and the like).

Figure 14:
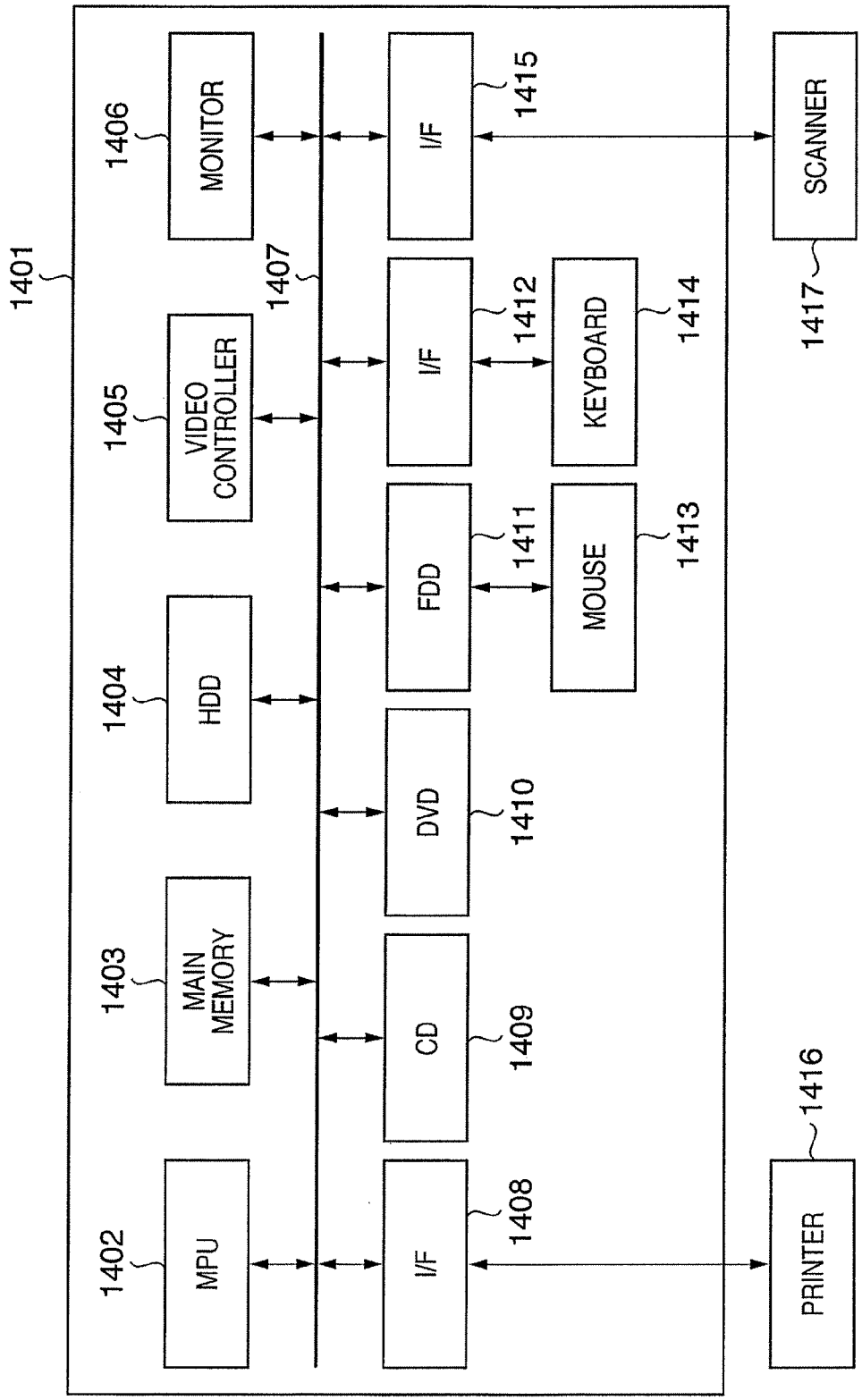
FIG. 14 is a block diagram showing an image processing apparatus according to the second embodiment.

FIG. 14 is a block diagram for explaining the arrangement of an image processing system according to this embodiment. Note that use of all the functions shown in FIG. 14 is not indispensable to implement the image processing apparatus.

Referring to FIG. 14, a computer 1401 can be a generally prevalent personal computer, which can receive an image scanned by an image input device 1417 such as a scanner or the like, and can edit and store the received image. Also, the computer 1401 can print the image obtained by the image input device 1417 using a printer 1416. Note that the user inputs various instructions and the like via a mouse 1413 and keyboard 1414.

Inside the computer 1401, respective blocks to be described below are connected via a bus 1407, and can exchange various data. Referring to FIG. 14, an MPU 1402 controls the operations of respective blocks in the computer 1401, or can execute internally stored programs. A main memory 1403 is a device which temporarily stores programs and image data to be processed for the processing to be executed by the MPU 1402. A hard disk drive (HDD) 1404 is a device which stores programs and image data transferred to the main memory 1403 or the like in advance, and can save image data after processing.

A scanner interface (I/F) 1415 is an I/F which is connected to the scanner 1417 that scans a document, film, or the like to generate image data, and can receive image data scanned by the scanner 1417. A printer I/F 1408 is an I/F which is connected to the printer 1416 that prints image data, and can transmit image data to be printed to the printer 1416. A CD drive 1409 is a device which can read out data stored in a CD (CD-R/CD-RW) as one of external storage media or write data on the CD. A floppy disk drive (FD) 1411 is a device which can read out data from an FD or can write data on the FD as in the CD drive 1409. A DVD drive 1410 is a device which can read out data from a DVD or can write data on the DVD as in the FDD 1411. When the CD, FD, DVD, or the like store image edit programs or a printer driver, these programs are installed on the HDD 1404 and are transferred to the main memory 1403 as needed.

An interface (I/F) 1412 is an I/F which is connected to the mouse 1413 and keyboard 1414 to accept input instructions from them. A monitor 1406 is a display device which can display the result and processes of watermark information extraction processing. Furthermore, a video controller 1405 is a device used to transmit display data to the monitor 1406.

As the correspondence with the image processing apparatus shown in FIG. 1, the image input unit 100 corresponds to the scanner 1417, and the configuration control unit 101 corresponds to the monitor 1406. The data processing unit 102 corresponds to the main memory 1403 and MPU 1402, the storage unit 103 corresponds to the HDD 1404, the image transmission/reception unit 104 corresponds to the I/Fs 1408 and 1415, and the image output unit 105 corresponds to the printer 1416.

Other Embodiments

Furthermore, the present invention is not limited to the first to third embodiments, and allows various modifications as long as the same effects can be obtained.

For example, in the first and second embodiments, the error correction code and redundancy are added as robustness data. Alternatively, either one of these data may be added as the robustness data. In the first to third embodiments, the image quality is determined based on the data size of the code data added with the robustness data. Alternatively, the image quality may be determined based on only the code data without adding the robustness data.

In the first and second embodiments, if the condition is not satisfied by assaying the image quality Qu, the processing for realizing the robustness/quality designated by the user is done by changing the error correction code size and redundancy. As another method, the image quality Qu is verified by updating only the error correction code size. If the image quality Qu is not satisfied yet, the redundancy may be updated.

Furthermore, in the first and second embodiments, the image quality Qu is determined using conditional formulas (5) to (7). However, the present invention is not limited to this. For example, the magnitude relationship between the image quality Qu and a certain threshold $\alpha'$ may be used as a condition. For example, if the image quality Qu is larger than the threshold $\alpha'$, generation and printing of code data are aborted.

Alternatively, the configuration control unit 101 may display a message for the user indicating that code data cannot be generated.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216916, filed Aug. 9, 2006, which is hereby incorporated by reference herein in its entirety.

What is claimed is:

1. An image processing apparatus comprising:
at least one processor operable to perform as:
a code data input unit configured to input code data for print out by a printing device on a print medium together with text or images, wherein the code data is inputted as a set of dots;
a division unit configured to divide a print area of the print medium on which the code data is to be printed into image cells, each of the image cells being suitable for expressing a portion of the code data, and the division being based on dividing the size of the print area by the data size of the code data;
a print precision data input unit configured to input print precision data indicating a print precision of the code data in terms of a minimum dot size printable by the printing device, wherein the print precision data is generated on the basis of a printed image output by a print precision determination processing on the printing device; and
an image quality determination unit configured to determine an image quality for print out by the printing device of the code data, based on a comparison between an area density of the dots included in the image cells and the print precision data.

2. The apparatus according to claim 1, further comprising an addition unit configured to add robustness data to the code data, wherein the addition unit adjusts a data size of the robustness data based on a determination result of the image quality.

3. The apparatus according to claim 2, further comprising a designation unit configured to designate an image quality, wherein when the image quality designated by the designation unit does not match the image quality determined by the image quality determination unit, a data size of the robustness data is adjusted.

4. The apparatus according to claim 2, wherein the addition unit adds, as the robustness data, at least one of an error correction code and a redundancy.

5. The apparatus according to claim 1, further comprising an output unit configured to output the code data.

6. The apparatus according to claim 5, wherein the output unit outputs the code data when a determination result of the image quality determination unit meets a predetermined image quality.

7. An image processing method comprising:
inputting code data for print out by a printing device on a print medium together with text or images, wherein the code data is inputted as a set of dots;
dividing a print area of the print medium on which the code data is to be printed into image cells, each of the image cells being suitable for expressing a portion of the code data, and the division being based on dividing the size of the print area by the data size of the code data;
inputting print precision data indicating a print precision of the code data in terms of a minimum dot size printable by the printing device, wherein the print precision data is generated on the basis of a printed image output by a print precision determination processing on the printing device; and determining an image quality for print out by the printing device of the code data, based on a comparison between an area density of the dots included in the image cells and the print precision data, wherein at least one of the above steps is performed by a processor.

8. A non-transitory computer-readable storage medium storing a program code which when executed by a computer, causes the computer to perform:

inputting code data for print out by a printing device on a print medium together with text or images, wherein the code data is inputted as a set of dots;

dividing a print area of the print medium on which the code data is to be printed into image cells, each of the image cells being suitable for expressing a portion of the code data, and the division being based on dividing the size of the print area by the data size of the code data;

inputting print precision data indicating a print precision of the code data in terms of a minimum dot size printable by the printing device, wherein the print precision data is generated on the basis of a printed image output by a print precision determination processing on the printing device; and determining an image quality for print out by the printing device of the code data, based on a comparison between an area density of the dots included in the image cells and the print precision data.

* * * * *